Dec. 27, 1932.     H. WILLSHAW ET AL     1,892,024
APPARATUS FOR MAKING THE FOUNDATION OF PNEUMATIC TIRES
Filed Aug. 19, 1930     5 Sheets-Sheet 1
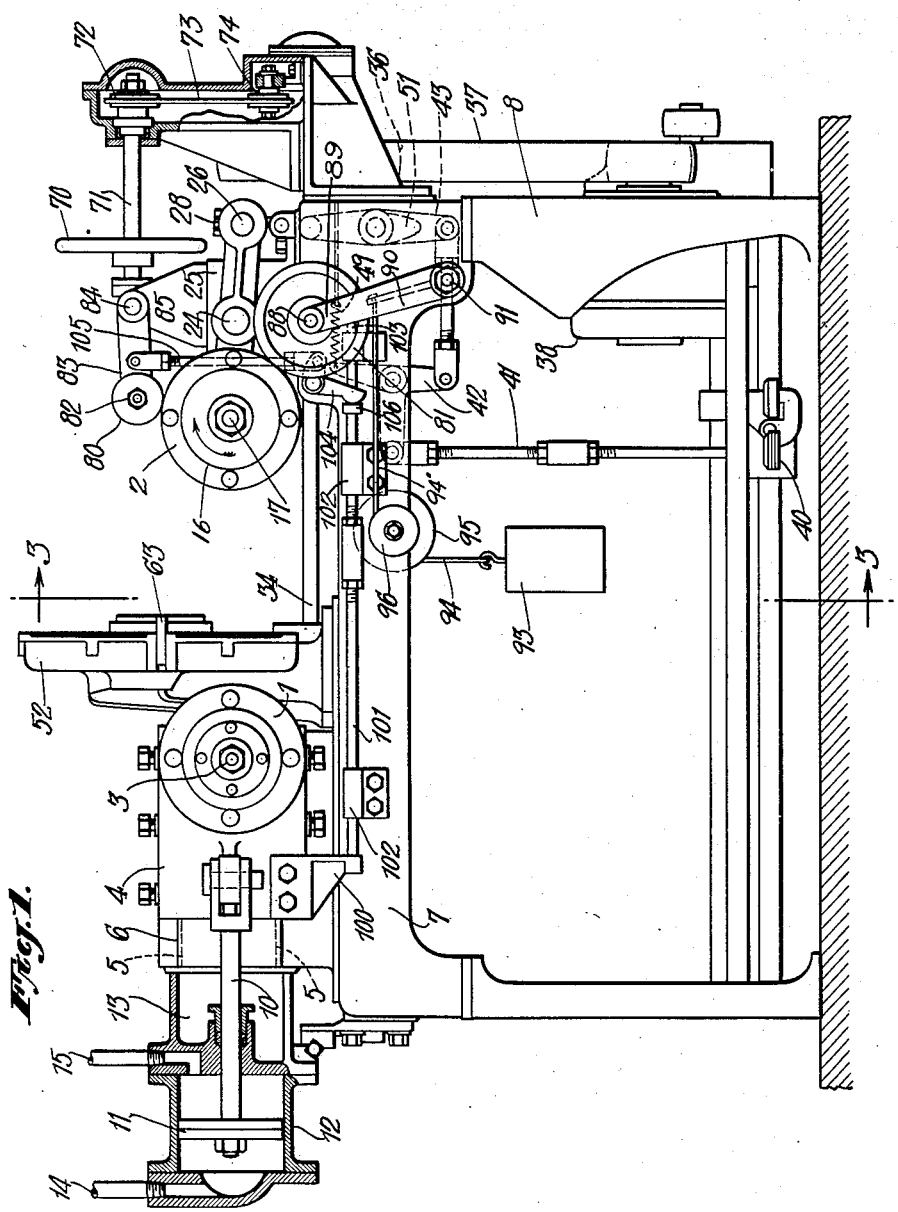
INVENTORS
HARRY WILLSHAW.
WILLIAM ALEXANDER COWLES.
BY  HAROLD SMITH.
ATTORNEYS

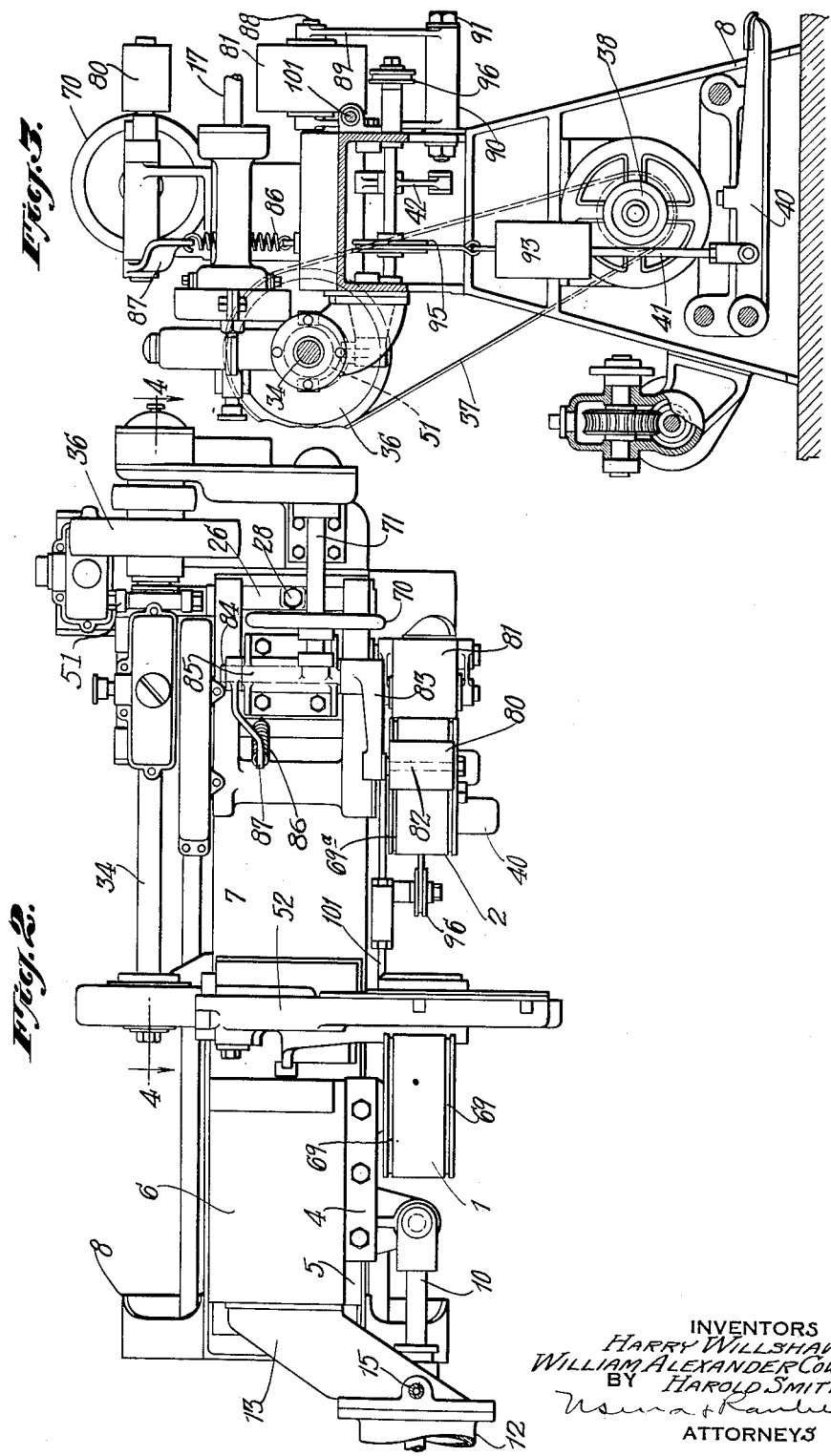

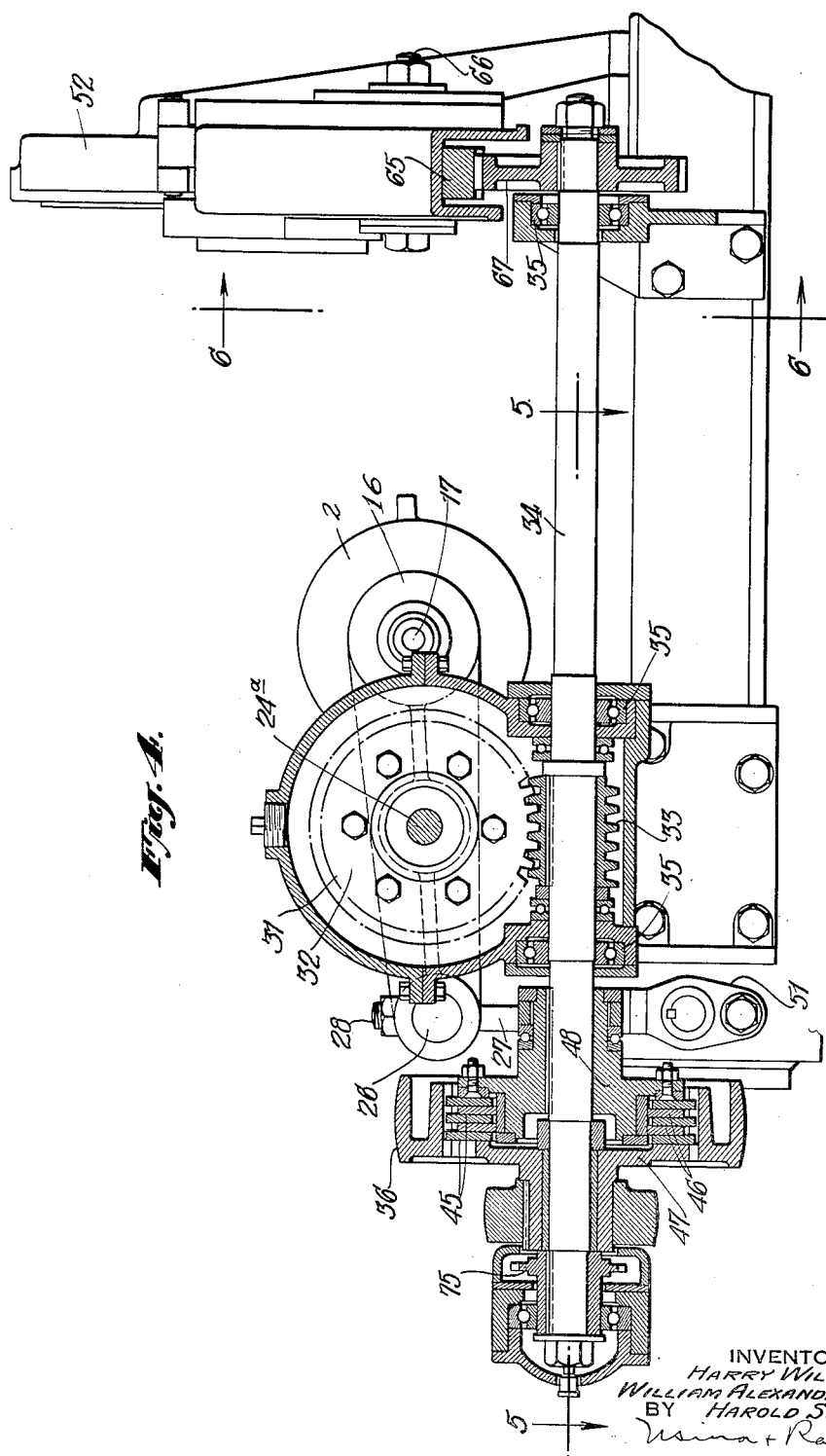

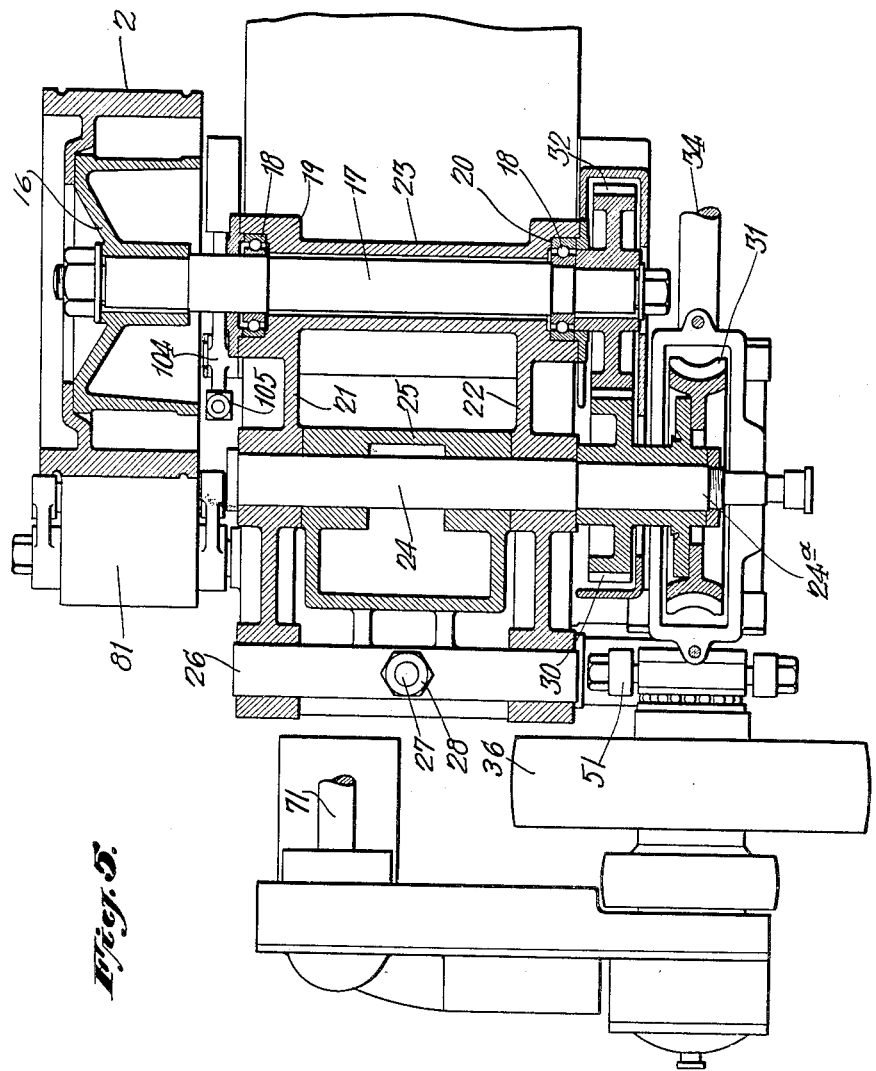

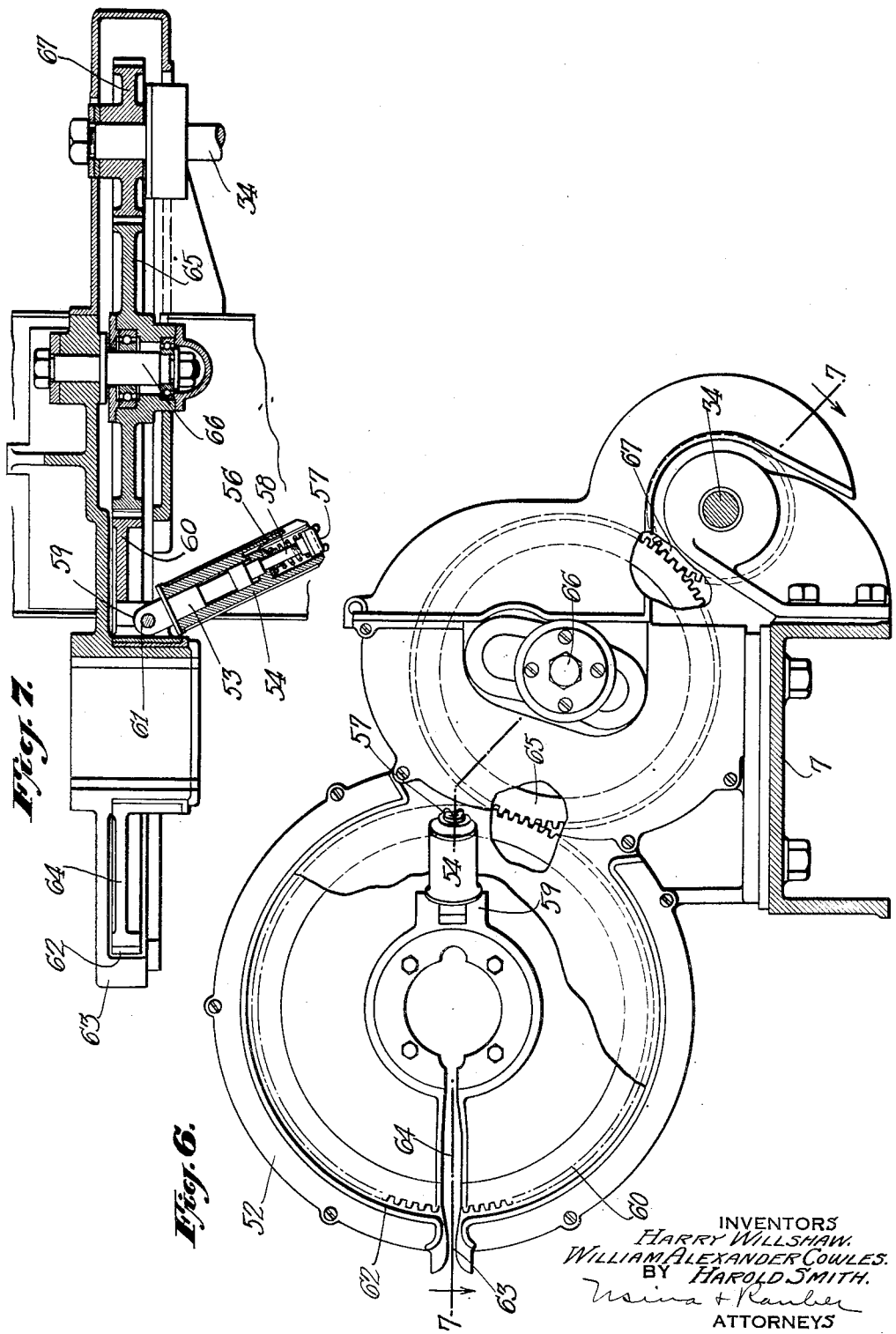

Patented Dec. 27, 1932

1,892,024

UNITED STATES PATENT OFFICE

HARRY WILLSHAW, OF WYLDE GREEN, AND WILLIAM ALEXANDER COWLES AND HAROLD SMITH, OF BIRMINGHAM, ENGLAND, ASSIGNORS, BY DIRECT AND MESNE ASSIGNMENTS, OF ONE-HALF TO DUNLOP RUBBER COMPANY LIMITED, A BRITISH CORPORATION, AND ONE-HALF TO FRANCIS SHAW AND COMPANY LIMITED, OF MANCHESTER, ENGLAND, A LIMITED STOCK COMPANY OF ENGLAND

APPARATUS FOR MAKING THE FOUNDATION OF PNEUMATIC TIRES

Application filed August 19, 1930, Serial No. 476,324, and in Great Britain August 24, 1929.

This invention has reference to apparatus for making the foundation of tires composed of fabric built upon inextensible endless edging wires or bead cores in a continuous helical wrapping.

In apparatus of this type a pair of parallel spaced wires or bead cores are passed longitudinally from a tensioning drum to a driving drum. While the fabric is wound about the spaced wires as they pass from one drum to the other, there is thus formed two oblique layers of fabric between the wires. The apparatus heretofore known for forming structures of this type were not readily applicable to the making of tire foundations of different sizes and did not permit an easy synchronization of the speed of the fabric winding with the passage of the wires or bead cores.

An object of this invention is to provide a machine of this type applicable to the making of a variety of sizes of foundations of the kind described and in which the performance and control are improved.

Other objects and features of this invention are to provide apparatus of the kind set forth in which interchangeable wire supporting drums may be easily substituted, to provide mechanism to synchronize the speed of rotation of the fabric spool with a substituted drum, and to provide an improved tensioning mechanism for the wires.

Other objects and features of the invention will appear from the following specification. The various features of the invention are illustrated in the accompanying drawings wherein:—

Fig. 1 is a view in side elevation embodying a preferred form of the invention and Fig. 2 is a plan view of the apparatus.

Fig. 3 is a vertical sectional view taken on line 3—3 of Fig. 1.

Fig. 4 is a detail view in section on line 4—4 of Fig. 2.

Fig. 5 is a view of a part of the machine taken partly in plan and partly in section on line 5—5 of Fig. 4.

Fig. 6 is a detail side elevation of the fabric supporting and rotating means, taken on line 6—6 of Fig. 4, and Fig. 7 is a sectional view on line 7—7 of Fig. 6.

In the present invention a pair of endless wires or cores are supported in spaced relation to one another by a pair of drums which are separable from one another so as to tension the wires or cores. At a position intermediate of the supporting drums a supply of fabric is applied to the wires or cores, being wound thereabout in an oblique direction, so as to form a helical wrapping.

The fabric in a spooled supply is supported on the periphery of a hollow wheel, through the center part of which the wires or bead cores pass and the helical wrapping is occasioned by the combined longitudinal movement of the wires or cores and rotation of the hollow fabric spool support.

The speeds of rotation of the supporting drums and the fabric supports are proportionate and synchronized one with another. If the circumference of the wires or bead cores is to be changed the driving drum is replaced by one of larger diameter and the speed of the fabric supporting and rotating wheel may also be varied by a variation of interchange in the transmitting gearing by which it is driven. The tension that is supplied to the wires or bead cores is supplied by pneumatic or other power means to the tensioning drum in such a manner as to exert a force on the latter in a direction away from the driving drum.

Referring to the accompanying drawings and more particularly to Figs. 1 to 4, a pair of wires or bead cores are supported in a taut condition upon a tensioning drum 1 and a driven drum 2. The tensioning drum 1 is rotatably mounted on a spindle 3 that is supported by a plate or slide 4 movable towards or from the drum 2 and positioned by keyways 5 upon a platform 6. The platform 6 is mounted on the bed plate 7 of the apparatus which is set upon legs 8 as shown.

Secured to the plate 4 is the stem 10 of a piston 11 housed in a cylinder 12 carried by the bracket 13.

The cylinder 12 is served through the ports 14 and 15 with pressure fluid, suitably controlled, which operates upon the piston 11 to displace the plate 4. The fluid conveying or control means is not shown.

The other drum 2, Figs. 4 and 5, comprises a displaceable annulus secured to the boss 16 which is keyed to and carried by a driven spindle 17. The spindle 17 is housed in friction reducing bearings 18 in the bosses 19 and 20 of the brackets 21 and 22 respectively, which are united by the sleeve 23 and are pivoted on the shaft 24 which is supported by the upstanding bracket 25, Figs. 1 and 5.

A yoke 26 set into and uniting the brackets 21 and 22 is recessed for a threaded post 27 upon which is a nut 28. By adjusting the nut 28 the brackets 21 and 22 may be tilted on the shaft 24 to raise or lower the drum 2. Keyed to the shaft 17, Fig. 5, and meshing with a spur wheel 30, which is connected to and driven by a worm gear wheel 31 freely rotatable upon the extension 24a of the shaft 24, is a spur gear wheel 32 which serves to rotate the drum 2.

The gear train 30—32 is driven through the worm wheel 33 Fig. 4 from the driving shaft 34 which is housed in bearings 35 supported on the frame of the machine and which is, in turn, driven through the pulley wheel 36 and belt 37 by the electric motor 38.

The shaft 34 may be disengaged from and engaged with the pulley 36 by means of a pedal 40 which through a link and lever mechanism 41 and 42, serves to control a suitable clutch means within the pulley.

The clutch may follow any suitable design and preferably contains a number of friction plates 45 and 46, the former being keyed to, and rotatable with, the boss 47 of the pulley wheel 36, and the others engaged by the part 48 which is keyed to the shaft 34. The plates 45 and 46 are forced into engagement by means of a spring 49 (shown in dotted lines in Fig. 1) when the pedal 40 is released, thereby operating the clutch and transmitting the drive to the shaft 34 acting through a clutch operating fork 51.

The fabric is wound onto the wires or bead cores, as they pass from drum 1 to drum 2, by a fabric supporting and rotating means, mounted within a casing 52 stationarily secured to the bed plate 7.

As shown in Figs. 6 and 7, a fabric spool spindle comprising a pin 53 giving support rotatably to a sleeve 54 upon which the fabric supply spool (not shown) is carried, is secured to lugs 59 upon a hollow wheel 60. The angularity of the spool can be readily adjusted about the spindle 61. A spring 56 tensioned by the nut 57 on the spindle 58 serves to restrain the rotation of the sleeve 54 and tension the fabric as it is pulled from the spool.

The casing 52 and hollow gear wheel 60 are slotted at 63 and 64 respectively, to enable the bead wires to be passed into the centre of the wheel 60.

The wheel 60 is driven by idler gear wheel 65 mounted on a displaceable spindle 66, which is in-turn, driven by a spur gear 67 keyed to the shaft 34.

During the operation of the apparatus both the drum 2 and the wheel 60 rotate simultaneously and synchronously, there being a definite relation between the peripheral speed of the bead cores which are carried in the grooves 69 and 69a of the drums 1 and 2, respectively, and the rotational speed of the wheel 60 as there is a determinate number of rotations or wrappings of the fabric to the circumferential length of the bead cores.

Therefore, should there be any alteration to the circumference of the bead cores the number of rotations of the fabric spool will require to be modified accordingly.

Hence, either the speed of the drum 2 or that of the wheel 60 must be altered. For the first alternative the annulus 2 itself may be replaced by another of different size. Thereupon the position of the new drum must be altered to bring the bead cores to the centre of the wheel 60.

For this purpose, the oscillating brackets 21 and 22 and the yoke 26 are provided. It will be seen that any adjustment of the nut 28 will either raise or lower the spindle 17 according to the direction of rotation.

For the other alternative the spur gear 67 is made interchangeable with other gear wheels of different sizes and the idler wheel 65 with its spindle 66 is displaceable both towards and away from the spur gear 67.

The shaft 34 may be rotated independently of the power means by a hand-wheel 70 mounted on a shaft 71 from which motion is transmitted to a chain-wheel 72 mounted on the shaft and thence through a chain 73, tensioned by an idler wheel 74, to a chain-wheel 75 keyed to the shaft 34, Fig. 4.

The bead cores and any materials laid thereupon, are engaged between the drum 2 and a pair of rollers 80 and 81, the former being rotatable upon a pin 82 projecting from a crank or bracket 83 secured to a spindle 84 housed in a bearing 85.

A spring 86 tensioning a lever 87 also secured to the spindle 84 holds the roller 80 in engagement with the drum 2.

The other roller 81 is supported by a spindle 88 set into the extremities of limbs 89 of a bracket 90 pivoted on a spindle 91.

The roller 81 may be swung about the spindle 91 into and out of engagement with the drum 2 but normally it is held in engagement with the drum by the weight 93 suspended by the cable 94 from which the pull of the weight is transmitted through the pulleys 95 and 96 to a cable 94' extending to the bracket 90 (Fig. 1).

At the time it is desired to disengage the rollers 80 and 81, from the drum 2, e. g., when tension is removed from the bead cores and when the slide 4 is moved towards the centre of the machine, the bracket 100 contacts the push-rod 101 which is housed in bearings 102 and directly engages the nearside limb 89 of the bracket 90 at 103.

There is provided upon the push-rod 101 to engage a bellcrank lever 104 which is connected to the part 83 by a link 105, a collar 106, which upon linear displacement of the push-rod 101 when the roller 81 is forced away from the drum 2, rocks the bellcrank 104 and raises the roller 80 from the drum 2.

What I claim is:

1. An apparatus of the type described which comprises a bead core winding drum having an outer cylindrical member and an inner supporting member on which said outer member is removably mounted, means rotating about a fixed center to wind a fabric around said core, and means to adjust the axis of said drum to bring said core on a level with the axis of said rotating means.

2. An apparatus of the type described which comprises a bead core driving drum, means for wrapping a fabric about the bead cores passing to said drum, and means for varying the rotational speeds of said fabric winding means and said bead core driving drum independently of each other, said driving drum comprising an outer removable cylindrical element and an inner supporting element, means rotating about a fixed center to wind a fabric around said core, and means to adjust the axis of said drum to bring said core on a level with the axis of said rotating means.

3. Apparatus of the type described which comprises a drum for driving a pair of bead cores, means for driving said drum, means for supporting a fabric supply and rotating it about the bead cores passing to said drum, a common driving means for said drum and said fabric supporting and rotating means, and a transmission means from said driving means to said fabric supporting and rotating means comprising a train of gears having gears displaceable one to another.

4. An apparatus of the type described which comprises a boss to receive a displaceable annulus of a bead core winding drum, means to wrap the fabric around the bead cores passing to said drum and means to synchronize the wrapping means to the peripheral speed of the displaceable annulus on said boss.

5. Apparatus of the type described which comprises a pair of drums for driving an endless bead core trained about said drums, means for separating said drums with a definite pressure to tension said bead core, means rotating about said bead core passing from one drum to another to wrap a fabric thereabout, one of said drums comprising a boss and one of a series of replaceable annuli of different outside diameters, and means for adjusting its axis relative to the axis of rotation of said wrapping means to maintain the latter axis level with the bead cores passing from one drum to the other.

6. Apparatus of the type described which comprises a pair of drums for driving an endless bead core trained about said drums, means for separating said drums with a definite pressure to tension said bead core, means rotating about said bead core passing from one drum to another to wrap a fabric thereabout, one of said drums comprising a boss and one of a series of replaceable annuli of different outside diameters, means for adjusting its axis relative to the axis of rotation of said wrapping means, to maintain the latter axis level with the bead cores passing from one drum to the other, and means for varying the relative speeds of said wrapping means and said drum of adjustable diameter.

7. Apparatus of the type described which comprises a pair of drums for driving an endless bead core trained about said drums, means for separating said drums with a definite pressure to tension said bead core, means rotating about said bead core passing from one drum to another to wrap a fabric thereabout, one of said drums comprising a boss and one of a series of replaceable annuli of different outside diameters, means for adjusting the height of said drum relative to the axis of rotation of said wrapping means, to bring the axis of the latter level with the bead in passing from one drum to the other, and means for pressing said bead core to said driving drum.

8. The apparatus of claim 5 in which the adjustment means of said drum comprises a bracket and a supporting fulcrum at right angles to the axis of said rotating means.

9. The apparatus of claim 5 in which said adjustable drum comprises an inner supporting member and outer cylindrical members removably mounted thereon.

10. The apparatus of claim 5 in which the angular speed of rotation of said drums and of said wrapping means is controlled by variable gearing.

In witness whereof, we have hereunto signed our names.

HARRY WILLSHAW.
WILLIAM ALEXANDER COWLES.
HAROLD SMITH.